United States Patent
Wong et al.

(10) Patent No.: US 9,889,951 B1
(45) Date of Patent: *Feb. 13, 2018

(54) SPACECRAFT EAST-WEST RADIATOR ASSEMBLY

(71) Applicant: Lockheed Martin Corporation, Bethesda, MD (US)

(72) Inventors: Hamilton Wong, Yardley, PA (US); Rok Park Buckley, Philadelphia, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 654 days.

This patent is subject to a terminal disclaimer.

(21) Appl. No.: 13/912,680

(22) Filed: Jun. 7, 2013

Related U.S. Application Data (63) Continuation-in-part of application No. 13/765,621, filed on Feb. 12, 2013, now Pat. No. 8,967,547.

(51) Int. Cl.
*B64G 1/50* (2006.01)

(52) U.S. Cl.
CPC .................... *B64G 1/506* (2013.01)

(58) Field of Classification Search
USPC .................. 244/171.8, 158.1, 172.6; 236/34; 165/41, 86, 104.21, 181
See application file for complete search history.

(56) References Cited

U.S. PATENT DOCUMENTS

| | | | |
|---|---|---|---|
| 5,036,905 A | 8/1991 | Eninger et al. | |
| 5,732,765 A * | 3/1998 | Drolen et al. | 165/41 |
| 5,794,890 A * | 8/1998 | Jones et al. | 244/171.8 |
| 6,591,899 B1 * | 7/2003 | Yee | 165/104.26 |
| 6,776,220 B1 | 8/2004 | Low et al. | |
| 2002/0153128 A1 * | 10/2002 | Low et al. | 165/104.14 |
| 2003/0121639 A1 | 7/2003 | Nomura | |
| 2004/0232284 A1 | 11/2004 | Tjiptahardja et al. | |
| 2010/0243817 A1 | 9/2010 | McKinnon et al. | |
| 2013/0200221 A1 * | 8/2013 | Goodzeit et al. | 244/171.8 |
| 2015/0069187 A1 * | 3/2015 | McKinnon et al. | 244/171.8 |

FOREIGN PATENT DOCUMENTS

EP      0780301 A1      6/1997

OTHER PUBLICATIONS

Extended European Search Report dated Jan. 4, 2017, which issued in European Application No. 14807496.6.

* cited by examiner

*Primary Examiner* — J. Woodrow Eldred
(74) *Attorney, Agent, or Firm* — McDermott Will & Emery LLP (57) ABSTRACT

A heat transfer assembly (HTA) includes an equipment panel having a first longitudinal length and a first radiator panel that is coupled to one of an east end and a west end of the equipment panel. The first radiator panel is longer in the longitudinal direction than the equipment panel and has least one longitudinal heat pipe. The HTA also includes at least one flexible heat pipe having a first rigid tube coupled to the equipment panel, a second rigid tube thermally coupled to the first longitudinal heat pipe, and a flexible tube coupled between the first and second rigid tubes. The equipment panel is configured to retain an equipment module in thermal contact with the first rigid tube.

12 Claims, 7 Drawing Sheets

SPACECRAFT EAST-WEST RADIATOR ASSEMBLY

CROSS-REFERENCE TO RELATED APPLICATIONS

This application is a continuation-in-part of application Ser. No. 13/765,621, filed on Feb. 12, 2013, now U.S. Pat. No. 8,967,547, which is incorporated herein by reference in its entirety.

STATEMENT REGARDING FEDERALLY SPONSORED RESEARCH OR DEVELOPMENT

Not applicable.

BACKGROUND

Field

The present invention generally relates to heat-transfer systems and, in particular, to a spacecraft radiator assembly with flexible heat pipes.

Description of the Related Art

Spacecraft in a geosynchronous earth orbit (GEO) typically operate such that one side continuously faces toward the ground as the satellite orbits the Earth. Such a satellite will have a north-south axis that, while in orbit, is approximately parallel to the north-south rotational axis of the Earth and an east-west axis that is perpendicular to the north-south axis. As the satellite orbits the Earth, the east and west sides of the spacecraft will alternately face toward the Sun and, twelve hours later, face away from the Sun toward deep space.

As GEO spacecraft are frequently used for communication and observation, the designers must accommodate complex communications payloads with large number of components and high thermal dissipation requirements. For example, a direct-broadcast or broadband spot-beam communications spacecraft may require dissipation of 14 kW or more of heat from the payload electronics. As is well known to those of skill in the art, "fixed" north and south radiator panels provide the most mass-efficient and cost-efficient heat rejection capability, and therefore their area is generally maximized within the constraints imposed by the launch vehicle fairing. However, it is often the case that additional heat rejection capability is required beyond what can be provided by such north and south radiator panels.

Figure 1:
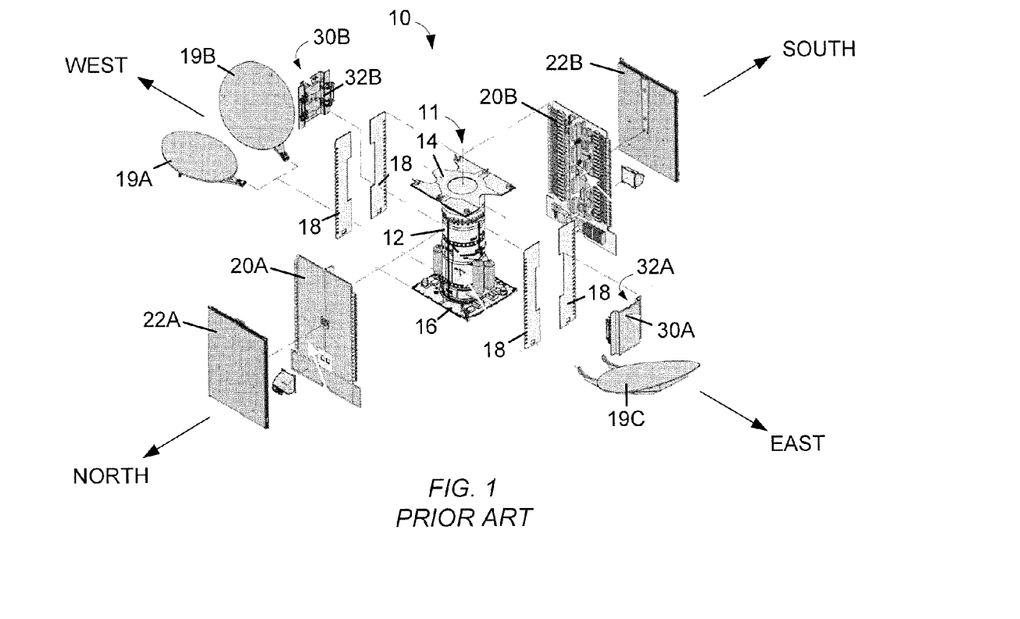
FIG. 1 is an exploded view of a spacecraft equipped with conventional east and west radiator panels.

One conventional approach to providing additional heat rejection capability is the addition of east and west radiator panels, as shown in the exploded view in FIG. 1 of a conventional spacecraft. Because east and west radiator panels receive direct sun exposure during each orbit, they are less effective than north and south radiator panels and therefore operate at higher average temperatures for an equivalent thermal load. This generally limits the use of east and west radiator panels to equipment such as output multiplexers (OMUXs) that can operate at higher temperatures. In addition, east and west radiator panels tend to undergo large diurnal temperature fluctuations, as the individual panels alternately face the Sun and deep space, and equipment that is thermally coupled to conventional east and west radiator panels may require significant heater power to limit the temperature fluctuations to an acceptable range.

Another drawback of conventional radiator panels is that, once the radiator panel is installed, it becomes difficult to access equipment inside the spacecraft including the equipment that is mounted on the radiator panels themselves. This increases the cost and time required for remove-and-replace operations that may be necessary during integration and test of a conventional spacecraft.

SUMMARY

The present invention generally relates to heat-transfer systems and, in particular, to a spacecraft radiator assembly with flexible heat pipes.

It is desirable to provide an east-west heat transfer assembly (EWHTA) having east and west radiator panels of increased size, compared to the length of the equipment panel, in order to provide an increased capability to dissipate heat. It is further desirable to incorporate flexible heat pipes between various elements to allow movement of one element with respect to the other element without having to disassemble the EWHTA or disconnect the heat pipes. Incorporation of flexible heat pipes between various elements also allows a portion of the EWHTA to be deployed or repositioned after the spacecraft reaches orbit.

In certain aspects of the present disclosure, a heat transfer assembly (HTA) is disclosed that includes an equipment panel having a first length in a longitudinal direction and a first radiator panel coupled to one of an east end and a west end of the equipment panel. The first radiator panel has a second length in the longitudinal direction and at least a first longitudinal heat pipe. The second length is greater than the first length. The heat transfer assembly also includes at least one flexible heat pipe comprising a first rigid tube coupled to the equipment panel and a second rigid tube thermally coupled to the first longitudinal heat pipe. The equipment panel is configured to retain an equipment module in thermal contact with the first rigid tube.

In certain aspects of the present disclosure, a radiator panel is disclosed that has a core structure, a longitudinal heat pipe disposed within the core structure, and a flexible heat pipe comprising a first portion disposed on a surface of the core structure and thermally coupled to the longitudinal heat pipe.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The present invention generally relates to heat-transfer systems and, in particular, to a spacecraft radiator assembly with flexible heat pipes.

The following description discloses embodiments of an east-west heat-transfer assembly that is particularly adapted for use on a GEO spacecraft. In certain embodiments, however, the same concepts and construction may be effectively used on other types of spacecraft as well as other applications where radiator panels provide a source of cooling.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

FIG. 1 is an exploded view of a spacecraft 10 equipped with conventional east and west radiator panels 30A and 30B. The "north", "south," "east," and "west" directions are defined as indicated by the arrows. The spacecraft 10 has a core structure 11 that, in this example, takes the form of a central cylinder 12 with a rectangular "Earth deck" 14 attached to an end that continuously faces toward the ground and a second deck 16 attached to the other end of the cylinder 12. A north radiator panel 22A is attached to a north equipment panel 20A and then to the north side of the core structure 11, and a south radiator panel 22B is attached to a north equipment panel 20B and then to the south side of the core structure 11. Structural panels 18 are attached to the east and west sides of the core structure 11 and fixed east and west radiator panels 30A, 30B are respectively attached to east and west equipment panels 32A, 32B and then attached, in this example, to the structural panels 18. Communication reflectors 19A, 19B, and 19C are deployably attached to the deck 16 such that each reflector established a line of communication toward the Earth. Other spacecraft components and subsystems, such as solar power arrays, have been omitted for clarity.

Figure 2:
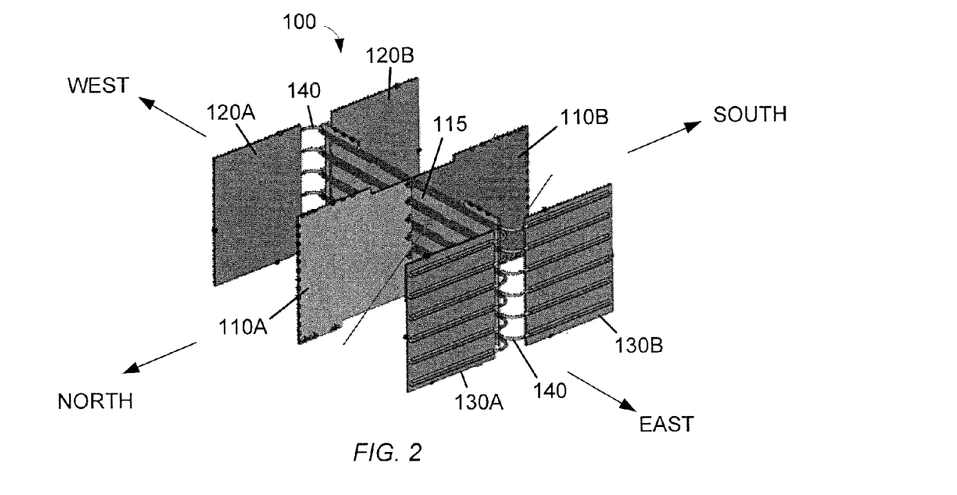
FIG. 2 depicts an exemplary EWHTA according to certain aspects of the present disclosure.

FIG. 2 depicts an exemplary EWHTA 100 according to certain aspects of the present disclosure. The "north", "south," "east," and "west" directions are defined in FIG. 2 as indicated by the arrows to indicate the operational orientation of the EWHTA 100 when installed in a GEO spacecraft (not shown in FIG. 2). The EWHTA 100 includes an equipment panel 115 and, in this example, two east radiator panels 130A, 130B that may also be referred to as the north-east radiator panel 130A and south-east radiator panel 130B. In certain embodiments, the north and south directions, i.e. a north-south axis, may be arbitrarily rotated in a plane that is perpendicular to an east-west axis without departing from the scope of this disclosure. The EWHTA 100 also includes two west radiator panels 120A, 120B. A plurality of flexible heat pipes 140 run from one of the east radiator panels 130A, 130B across the equipment panel 115 to one of the west radiator panels 120A, 120B. The routing of the flexible heat pipes 140 is discussed in greater detail with respect to FIG. 3. The construction of the flexible heat pipes 140 is discussed in greater detail with respect to FIG. 4. Also shown in FIG. 2 are two north-south panels 110A, 110B that, in certain embodiments, are thermally coupled to the equipment panel 115 such that heat absorbed by the north-south panels 110A, 110B, for example from equipment modules thermally coupled to the north-south panels 110A, 110B, may be conducted to the equipment panel 115 and then rejected to one of the east or west radiator panels.

Figure 3:
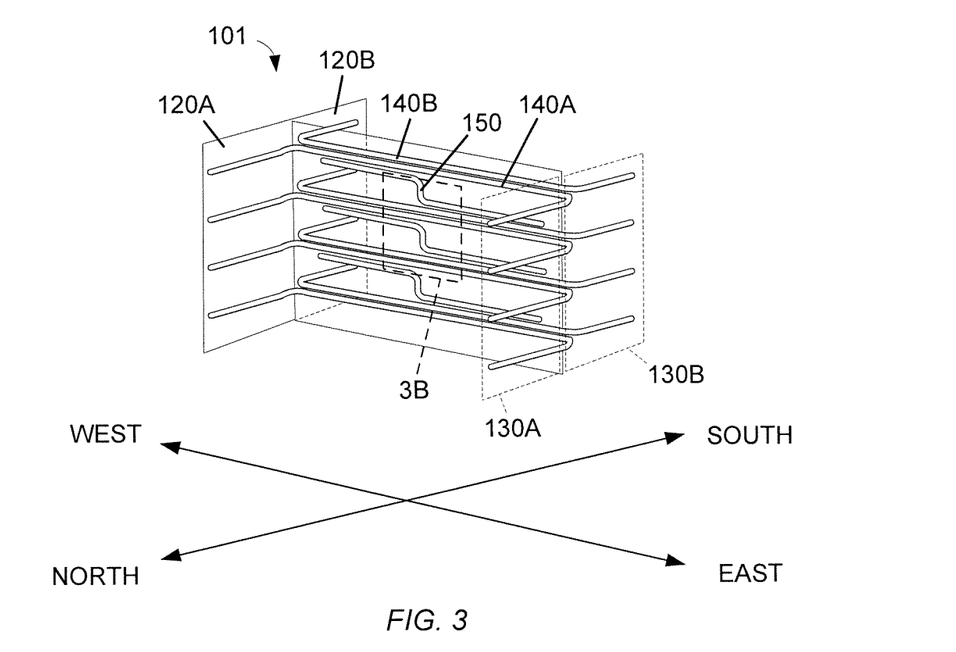
FIG. 3 is a wire-frame view of another embodiment of an EWHTA according to certain aspects of the present disclosure.

FIG. 3 is a wire-frame view of another embodiment 101 of an EWHTA according to certain aspects of the present disclosure. In this view, the two east radiator panels 130A, 130B are shown only in outline so as to reveal the routing of the flexible heat pipes 140. The dashed-line box labeled "3B" is shown in enlarged form in FIG. 6.

It can be seen that, in this embodiment, the flexible heat pipe 140A runs from the north-west radiator panel 120A across the equipment panel 115 and onto the north-east radiator panel 130A and the flexible heat pipe 140B runs from the south-west radiator panel 120B across the equipment panel 115 and onto the south-east radiator panel 130B. In certain embodiments, the flexible heat pipe 140A may be coupled to the south-east radiator panel 130B in place of north-east radiator panel 130A. In certain embodiments, the flexible heat pipe 140B may be coupled to the north-east radiator panel 130A in place of south-east radiator panel 130B. In certain embodiments, a plurality of flexible heat pipes 140 run in parallel from one of the west radiator panels 120A, 120B to one of the east radiator panels 130A, 130B. The EWHTA 101 also includes formed heat pipes 150 mounted on the equipment panel 115. These formed heat pipes serve to couple the various flexible heat pipes 140 so as to, for example, minimize variations in temperature across the equipment panel 115. The configuration and function of these formed heat pipes 150 are discussed in greater detail with respect to FIG. 6.

When a spacecraft that includes an EWHTA 101 or similar, the east and west directions of the spacecraft will point at the Sun once per orbit. At one point in the orbit, the west radiator panels 120A, 120B are directly exposed to the Sun, which has an effective surface temperature of approximately 5800 K (10,000° F.), and the east radiator panels 130A, 130B will be partially exposed to deep space, which has an average temperature of approximately 3 K (−454° F.). The west radiator panels 120A, 120B will absorb radiated energy from the Sun and their temperature will increase, while the east radiator panels 130A, 130B will reject heat to deep space and their temperature will decrease. With reference to a conventional spacecraft 10 of FIG. 1, equipment modules on the west equipment panel 32B that are thermally coupled to only the west radiator panel 30B will be significantly heated by heat transfer from the west radiator panel 30B as the temperature of the west radiator panel 30B exceeds the current temperature of those equipment modules. Equipment modules mounted on the east or west equipment panels 32A, 32B must therefore be able to survive high operational temperatures driven by this absorption of heat from the Sun as there is not alternate source of cooling to offset the heating by the Sun. On the east side of the example spacecraft 10, equipment modules on the east equipment panel 32A, being thermally coupled to only the east radiator panel 30A will be significantly cooled by heat transfer to the west radiator panel 30A as the temperature of the east radiator panel 30A drops toward the temperature of deep space. It is possible to minimize the reduction in the operational temperature of the equipment on the equipment panel 30A while being cooled by deep space by attaching heaters (not shown in FIG. 1 of 2) to either the equipment modules or the equipment panel 30A. The use of such heaters, however, places an additional load on the power system of the spacecraft 10. Even with the heaters, the temperature range between the minimum temperature seen by the equipment modules when their radiator panel is facing toward deep space and the maximum temperature seen when their radiator panel is facing toward the Sun can be quite large and affect, for example, the reliability and performance of the equipment module.

In contrast, a spacecraft with an EWHTA 100 will expose equipment modules coupled to east and west radiators 120A, 120B, 130A, 130B to a smaller temperature range, compared to equipment modules coupled to conventional east and west radiators 30A, 30B on the spacecraft 10. In the example where the west side of the spacecraft is facing toward the Sun, the west radiator panels 120A, 120B heat up due to absorption of heat from the Sun. This absorbed heat, however, is transferred all the way to the east radiation panels 130A, 130B by the flexible heat pipes 140. This direct transfer of heat from the heated west radiator panels 120A, 120B to the cooled east radiation panels 130A, 130B reduces the maximum temperature seen by the west radiator panels 120A, 120B and simultaneously increases the minimum temperature seen by the east radiation panels 130A, 130B while in this orientation to the Sun. The equipment modules that are thermally coupled to the equipment panel 115 will, therefore, see a smaller range of temperatures as the position of the Sun, relative to the spacecraft, moves between the west side and the east side. In addition, the use of heaters to maintain the temperature of the equipment modules above a minimum operational temperature will be reduced, if not eliminated, as the transferred heat from the hot radiation panels, in this example west radiator panels 120A, 120B, to the cold radiation panels, in this example east radiator panels 130A, 130B, will increase the minimum temperature seen by the radiation panels and, therefore, the minimum temperature seen by the equipment modules even in the absence of heaters.

A series of thermal simulations were performed for equipment modules mounted on a conventional east radiator panel 30A, such as shown in FIG. 1 and the same equipment modules mounted on an EWHTA 100. The simulations determined the maximum and minimum temperatures seen by the equipment modules and the amount of additional heater power required to limit the temperature swing of the equipment modules to less than 30° C. (86° F.). Simulations were run for the following cases:

| conditions of simulation | acronym |
| --- | --- |
| vernal equinox, end-of-life performance | VEEOL |
| summer solstice, beginning-of-life performance | SSBOL |
| autumnal equinox, beginning-of-life performance | AEBOL |
| winter solstice, beginning-of-life performance | WSBOL |

Table 1 lists the predicted minimum and maximum temperatures and the heater power required to maintain the temperature of the equipment modules within the allowable temperature swing. Predicted values that exceed the limits are shown in boldface. It will be apparent that the conventional system allows the maximum temperature of the equipment modules to exceed the maximum limit while still requiring significant heater power during the portion of the orbit while the associated radiator panel 30A, 30B is facing deep space. In contrast, the system of the present disclosure requires only a relatively small amount of heater power and only during the vernal equinox conditions.

TABLE 1

Temperature performance of east-west radiator systems

| Configuration | Analysis case | Min temp (deg C.) | Max temp (deg C.) | Max allowable temp (deg C.) | Diurnal temp swing (deg C.) | Max allowable swing (deg C.) | Heater power required (W) |
| --- | --- | --- | --- | --- | --- | --- | --- |
| System according to the present disclosure | VEEOL | 52 | 83 | 90 | 32 | 30 | 12 W |
| | SSBOL | 44 | 59 | 90 | 16 | 30 | None |
| | AEBOL | 38 | 62 | 90 | 25 | 30 | None |
| | WSBOL | 57 | 81 | 90 | 25 | 30 | None |
| Conventional design | VEEOL | 47 | 107 | 90 | 62 | 30 | 195 W |
| | SSBOL | 34 | 74 | 90 | 41 | 30 | 66 W |
| | AEBOL | 33 | 76 | 90 | 43 | 30 | 65 W |
| | WSBOL | 46 | 105 | 90 | 59 | 30 | 178 W |

Figure 4:
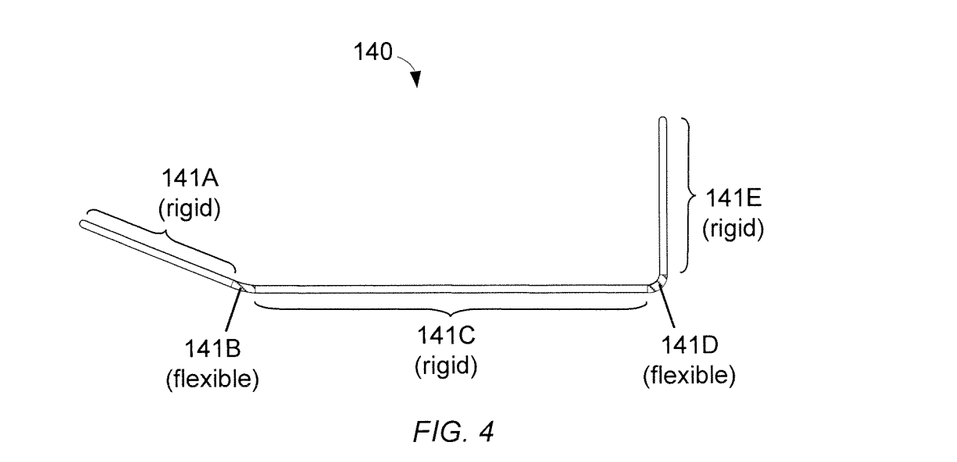
FIG. 4 is a top view of an exemplary flexible heat pipe according to certain aspects of the present disclosure.

FIG. 4 is a top view of an exemplary flexible heat pipe 140 according to certain aspects of the present disclosure. The flexible heat pipe 140 comprises a first rigid tube 141A, a second rigid tube 141C, a third rigid tube 141E, a first flexible tube 141B sealingly coupled between the first and second rigid tubes 141A, 141C, and a second flexible tube 141D sealingly coupled between the second and third rigid tubes 141C, 141E. The first and third rigid tubes 141A, 141E are each closed at an outboard end. The assembly of tubes 141A-141E form a sealed interior volume (not visible in FIG. 4) that contains a heat transfer fluid. In certain embodiments, the flexible heat pipe contains a wick (not visible in FIG. 4) that creates a gas-phase passage and a liquid-phase passage within the interior volume that facilitates the transfer of the liquid-phase heat transfer fluid from the colder portion(s) of the flexible heat pipe 140 to the hotter portion(s) of the flexible heat pipe 140. In certain embodiments, the first and second flexible tubes 141B, 141D are configured such that the adjacent rigid portions 141A and 141C and 141E can be rotated with respect to each other over a range of angles without disconnection of the various elements of the flexible heat pipe 140. In certain embodiments, the rigid tube 141A can be moved over a range of angles with respect to rigid tube 141C. In certain embodiments, rigid tube 141A can be oriented at any angle between 0°, i.e. extending straight out from, and 90° with respect to rigid tube 141C. In certain embodiments, the rigid tube 141A can be moved over a range of −90° to +900 with respect to rigid tube 141C.

Figure 5:
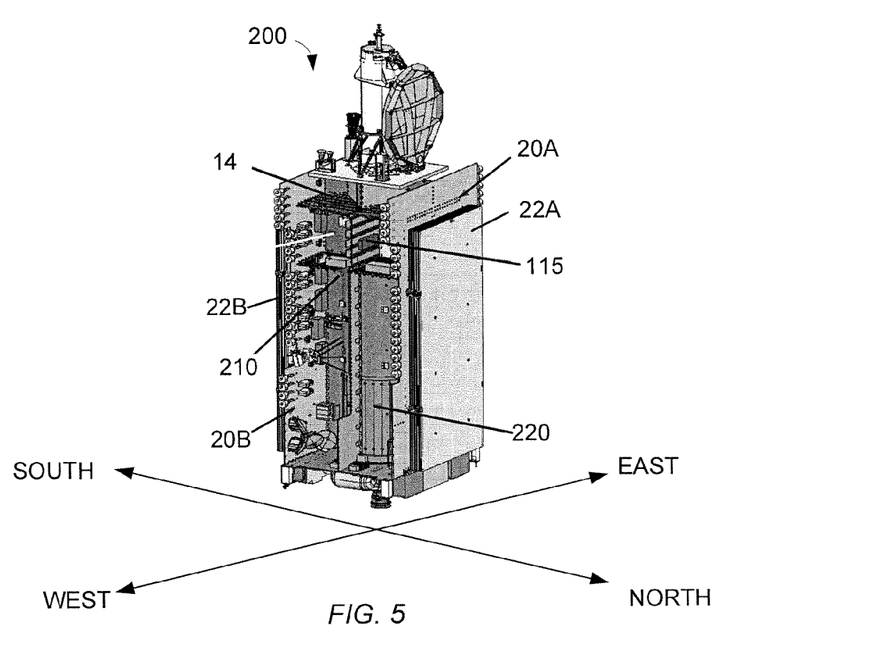
FIG. 5 is a perspective view of an exemplary spacecraft with an EWHTA according to certain aspects of the present disclosure.

FIG. 5 is a perspective view of an exemplary spacecraft 200 with a EWHTA 100 according to certain aspects of the present disclosure. The west radiator panels 120A, 120B and east radiator panels 130A, 130B have been removed to expose the inner elements of the spacecraft 200. It will be apparent that the central cylinder 220 has been vertically split, compared to the central cylinder 12 of FIG. 1, by the introduction of the equipment panel 115 that extends from the Earth deck 14 downward through the split mid-deck 210. North and south equipment panels 20A, 20B and north and south radiator panels 22A, 22B are fixedly mounted to the Earth deck 14.

Figure 6:
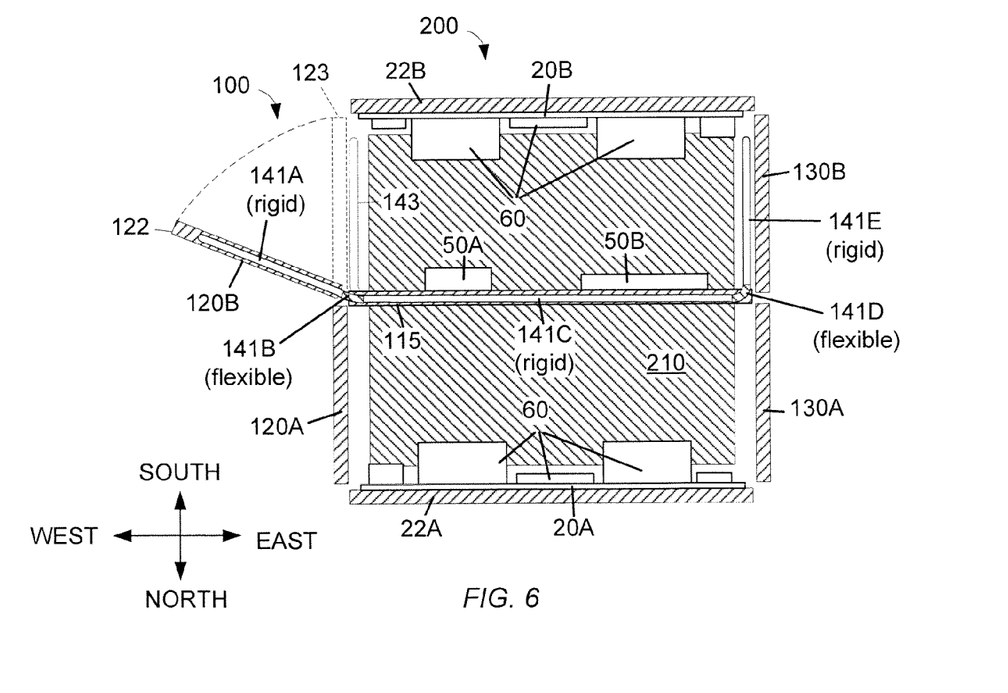
FIG. 6 is a cutaway top view of the spacecraft of FIG. 5 according to certain aspects of the present disclosure.

FIG. 6 is a cutaway top view of the spacecraft 200 of FIG. 5 according to certain aspects of the present disclosure. The view is taken just below the Earth deck 14 and faces downward, with certain elements removed for clarity. The middeck 210 is visible in the middle, with the north and south equipment panels 20A, 20B and north and south radiator panels 22A, 22B positioned at the top and bottom, in the orientation of this view. Various pieces of equipment 60 are mounted to the north and south equipment panels 20A, 20B.

An EWHTA 100 is visible in the middle of the spacecraft 200, with the equipment panel 115 passing left-to-right in this view across the middle of the middeck 210. The south-west radiator panel 120B is shown in an "open" position, with the closed position 122 shown in dashed line. A flexible heat pipe 141 is shown with the rigid tube 141A embedded within the open radiator panel 122, and with the closed position 143 of the same rigid tube 141A shown in dashed line. Representative equipment modules 50A and 50B are shown mounted to the equipment panel 115 and thermally coupled to the rigid tube 141C of the flexible heat pipe 100, which is shown as embedded within the panel 115. Embedding the rigid pipe 141C within the equipment panel 115 may provide greater flexibility in positioning equipment on the panel, as well as the potential to mount equipment to both sides of the equipment panel 115 with equal thermal performance. In certain embodiments, the rigid portions of heat pipe 141 may be mounted to an inner or outer surface of one or more of the radiators 120B, 130B or to one of the surfaces of the equipment panel 115. Mounting the heat pipe on the surface may provide a benefit in manufacture or assembly of the radiators 120B, 130B or equipment panel 115. As an example, the rigid tube 141E is shown as mounted on the inner surface of radiator 130B, for example by bolting and thermally bonding with brackets (not shown in FIG. 6). Other means of thermally coupling the various portions of heat pipe 141 to the respective radiators and panels will be apparent to those of skill in the art. The mounting of equipment modules 50A and 50B is discussed in greater detail with respect to FIG. 7. It will be apparent how the flexible tube 141B, positioned proximate to the hinge of the radiator panel 122, enables the radiator panel 122 to be opened without requiring prior removal of equipment or the flexible heat pipe 141, thus simplifying the process of gaining access to the equipment within the spacecraft 200.

Figure 7:
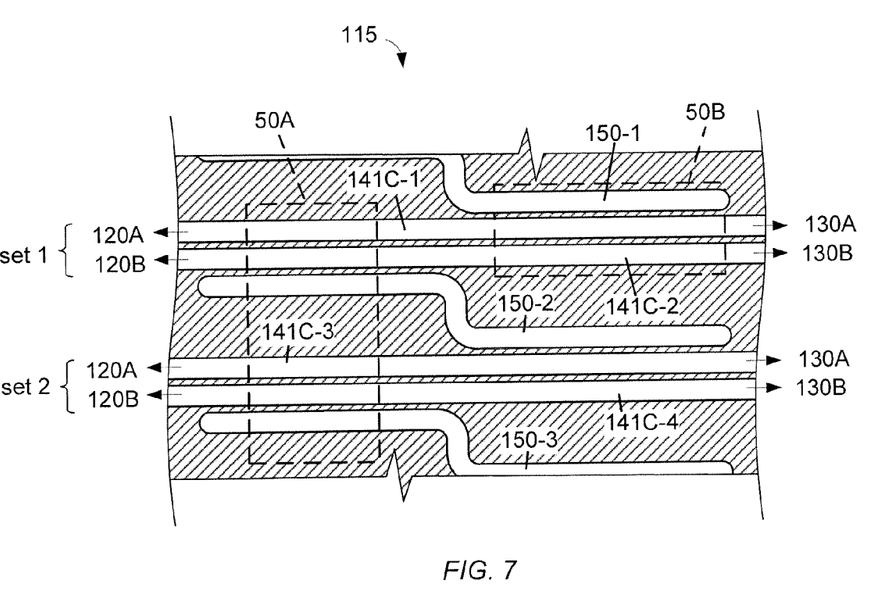
FIG. 7 is an enlarged side view of a portion of equipment panel of the EWHTA of FIG. 5 according to certain aspects of the present disclosure.

FIG. 7 is an enlarged side view of a portion of equipment panel 115 of the EWHTA 100 of FIG. 5 according to certain aspects of the present disclosure. The rigid tubes 141C are shown for multiple flexible heat pipes 141, wherein the nomenclature of "141C-x" indicates individual flexible heat pipes 141. The arrows at the left and right section-lines indicate which radiator panel each line is connected to. For example, the first flexible heat pipe 141, identified as "141C-1" is thermally coupled to north-west radiator panel 120A on the left and to north-east radiator panel 130A on the right. The flexible heat pipes 141 are arranged in pairs, for example flexible heat pipes 141C-1 and 141C-2, which are respectively coupled to the northern and southern of the east and west radiator panels.

The dashed-line boxes 50A and 50B indicate where the representative electronics modules 50A and 50B shown in FIG. 5 are mounted. Electronics module 50A is mounted over, and thermally coupled to, the flexible heat pipes 141C-1, 141C-2, 141C-3, and 141C-4. If the equipment module 50A is considered to be at a uniform temperature across its base, then the equipment module 50A will transfer heat to each of the four flexible heat pipes 141C-1, 141C-2, 141C-3, and 141C-4. This provides redundancy in the event that performance of one of the flexible heat pipes 141 is degraded, for example by loss of the heat transfer fluid in that flexible heat pipe 141. Equipment module 50B is coupled to only two flexible heat pipes 141C-1 and 141C-2. In certain embodiments, the equipment modules 50A and 50B are attached to the support structure of equipment panel 115 and simply held in thermal contact with the rigid tubes 141C of the various flexible heat pipes. In certain embodiments, the equipment modules 50A and 50B may be attached directly to the rigid tubes 141C of one or more of the flexible heat pipes 141. In certain embodiments, additional thermal coupling elements, for example shaped copper straps or thermal grease, may be provided to improve the thermal coupling of the equipment modules 50A, 50B to the respective rigid tubes 141C.

In certain embodiments, formed heat pipes 150 thermally couple one of each pair of flexible heat pipes 141 to one of the adjacent pairs. In this embodiment, a first portion of a formed heat pipe 150-2 is thermally coupled to the flexible heat pipe 141C-2 of one pair and a second portion of the formed heat pipe 150-2 is coupled to flexible heat pipe 141C-3 of an adjacent pair, with a short vertical portion joining the first and second portions. This provides additional redundancy across the plurality of flexible heat pipes 141, in the event that one of the flexible heat pipes 141 fails, and also serves to distribute heat across the EWHTA 100 more evenly. For example, if the equipment module 50B was dissipating a large amount of heat, the flexible heat pipes 141C-1 and 141C-2 would be running hotter than the adjacent heat pipes 141C-3 and 141C-4. The formed heat pipe 150-2 will transfer some of the heat from flexible heat pipe 141C-2 to flexible heat pipe 141C-3, thereby assisting is transferring this heat to the radiator panels 120A, 120B, 130A, and 130B.

Figure 8:
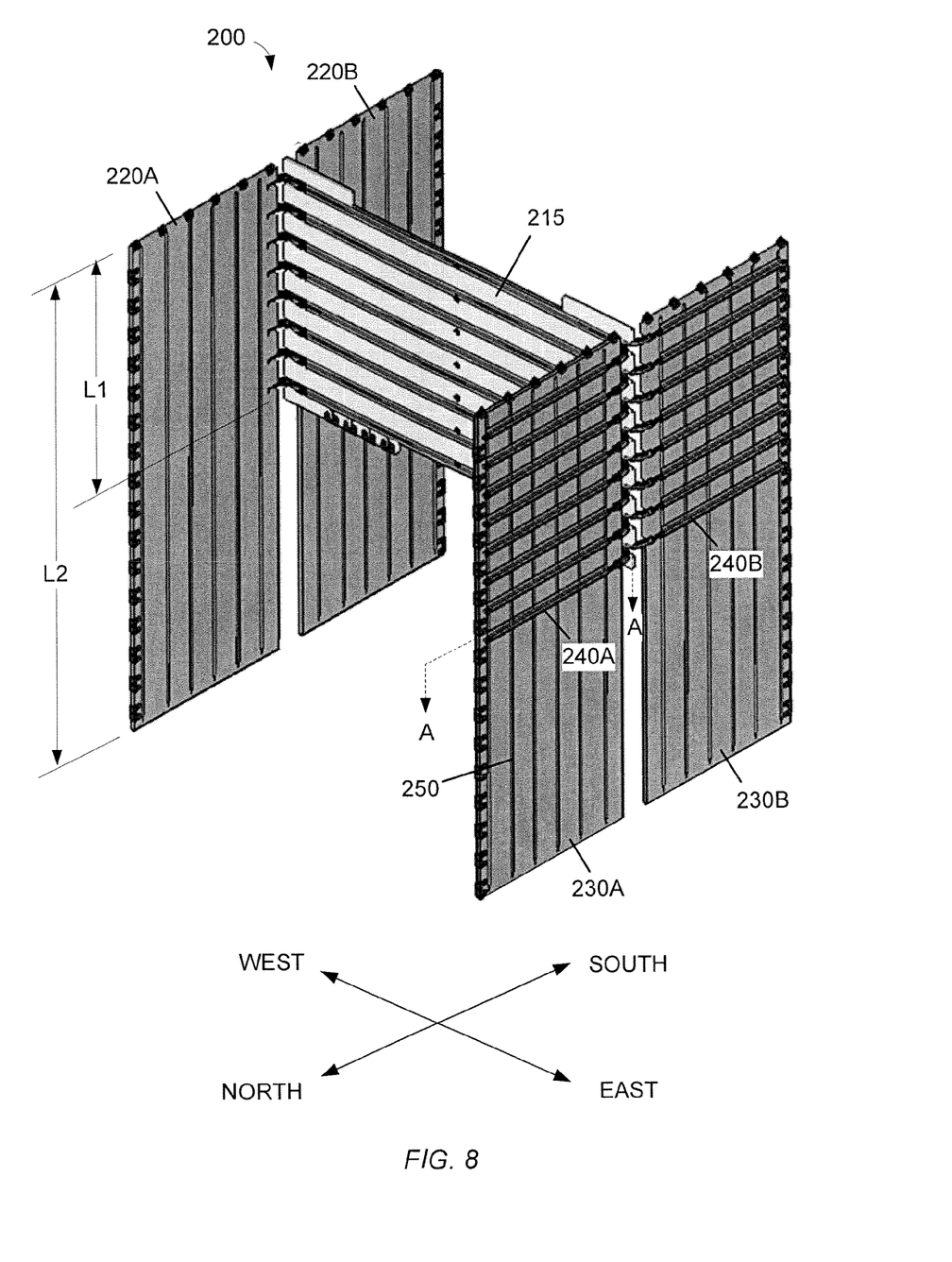
FIG. 8 is a perspective view of another exemplary embodiment of an EWHTA according to certain aspects of the present disclosure.

FIG. 8 is a perspective view of another exemplary embodiment 200 of an EWHTA according to certain aspects of the present disclosure. In this embodiment, the equipment panel 215 is generally similar to the equipment panel 115 of the EWHTA 100 of FIG. 3, and the flexible heat pipes 240A and 240B are generally similar to the flexible heat pipes 140A, 140B of EWHTA 100. In the example embodiment shown in FIG. 8, portions of the flexible heat pipes 240A, 240B are disposed on an exposed surface of a radiator panel, for example the east side of north-east radiator panel 230A. In certain embodiments, the flexible heat pipes 240A, 240B are disposed on an interior surface of a radiator panel, for example the west side of the same north-east radiator panel 230A.

In EWHTA 200, the east-west radiator panels 220 are extended in a longitudinal direction so as to provide additional radiative surface area. In the example of FIG. 8, the equipment panel 215 has a longitudinal length L1 and each of the radiator panels 220A, 220B, 230A, and 230B have a longitudinal length L2 that is approximately twice L1. In certain embodiments, L2 may have a value that is between L1 and (2×L1). In certain embodiments, L2 may have a value that is greater than (2×L2). In certain embodiments, all of the radiator panels 220A, 220B, 230A, and 230B may have a common length L2. In certain embodiments, each of the radiator panels 220A, 220B, 230A, and 230B may have a different length L2.

At least one of the radiator panels 220A, 220B, 230A, and 230B has at least one longitudinal heat pipe 250. The longitudinal heat pipes 250 transfer heat from the region proximate to the heat pipes 240A, 240B to the region proximate to the other end of the respective radiator panel 220A, 220B, 230A, and 230B. In the example of FIG. 8, each radiator panel 220A, 220B, 230A, and 230B has six heat pipes 250 spaced across the north-south width. In this example, the heat pipes 250 are straight, rigid heat pipes that are thermally coupled to the surface of the respective radiator panel 220A, 220B, 230A, and 230B. In certain embodiments, the heat pipes 250 have a length that is approximately equal to L2. In certain embodiments, the heat pipes 250 have a length that is less than L2. The heat pipes 250 may be disposed on an exposed surface of a radiator panel, for example the east side of north-east radiator panel 230A, or an interior surface, for example the west side of the same north-east radiator panel 230A. In certain embodiments the heat pipes 250 may be thermally coupled to one or more of the flexible heat pipes 240A, 240B as described in greater detail with respect to FIG. 9B.

Figure 9A:
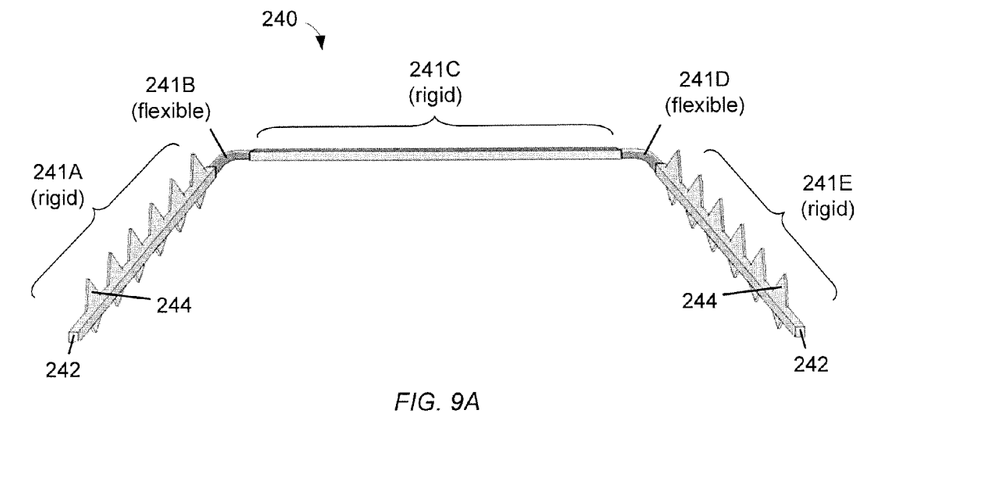
FIG. 9A depicts an exemplary heat pipe used with the EWHTA of FIG. 8 according to certain aspects of the present disclosure.

FIG. 9A depicts an exemplary flexible heat pipe 240 used with the EWHTA of FIG. 8 according to certain aspects of the present disclosure. The example flexible heat pipe 240 comprises a rigid center tube 241C having first and second flexible tubes 241B, 241D coupled at each end with rigid tubes 241A and 241E coupled to the respective flexible tubes 241B, 241D. In the EWHTA 200 of FIG. 8, the center tube 241C is coupled to the equipment panel 215 and the rigid tubes 241A, 241E are each coupled to one of the radiator panels 220A, 230A or to 220B, 230B. In certain embodiments, rigid tube 241A may be coupled to a northern radiator panel, for example radiator panel 220A, while rigid tube 241E of the same flexible heat pipe 240 may be couple to a southern radiator panel, for example radiator panel 230B. In this example, the rigid tubes 241A and 241E each have tubes 242 with a rectangular cross-section and a series of flanges 244 coupled to the tube 242. The spacing of the flanges 244 matches the separation of the heat pipes 250 in the respective radiator panel 220A, 220B, 230A, 230B.

Figure 9B:
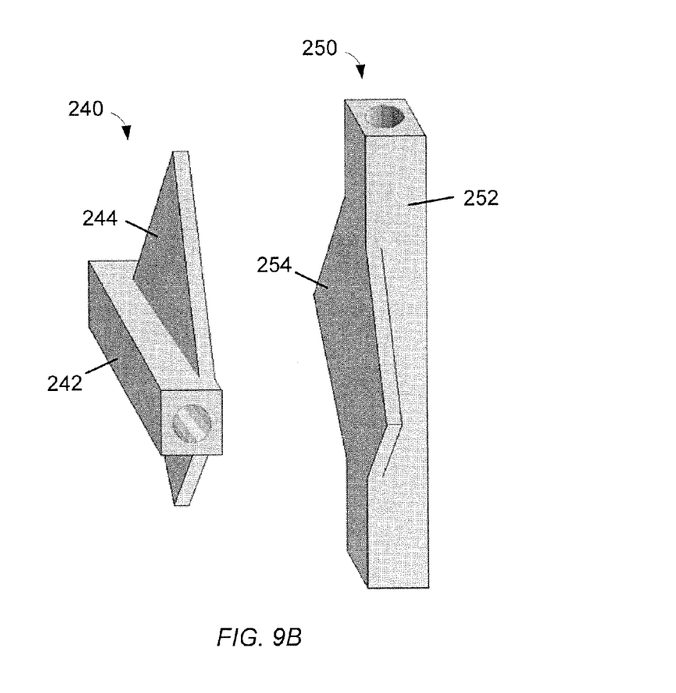
FIG. 9B depicts an exemplary thermal connection between heat pipes in the EWHTA of FIG. 8 according to certain aspects of the present disclosure.

FIG. 9B depicts an exemplary thermal connection between heat pipes 240, 250 in the EWHTA 200 of FIG. 8 according to certain aspects of the present disclosure. It can be seen that the flexible heat pipe 240 and the longitudinal heat pipe 250 have corresponding flanges 244, 254. The flanges 244, 254 provide a larger contact area, compared to the area of the intersection of the tubes 242, 252, to increase the thermal coupling between heat pipes 240, 250. The flanges 244, 254 may be formed as an integral part of the tubes 242, 252 or formed as separate components and then coupled to the tubes 242, 252 by a process such as brazing, bonding, or any other attachment method as known to those of skill in the art.

In this example, the flanges 244, 254 are rhombuses with a width that is generally equal to the length of the rhombus shape, if projected onto the tubes 242, 252. In certain embodiments, the width and length may both be approximately 3 inches. In certain embodiments, the width and length may be less than 3 inches. In certain embodiments, the flanges 244, 254 may be other shapes and sizes. In certain embodiments, the flanges 244, 254 may be different in shape or size from each other. In certain embodiments, one of the heat pipes 240, 250 may not provide a flange while the other flanges of the heat pipes 240, 250 may provide a flange.

In certain embodiments, the flanges 244, 254 may be bonded to each other, for example with a thermally conductive adhesive (not visible in FIG. 9B). In certain embodiments, the flanges 244, 254 may be mechanically secured to each other, for example using a fastener such as a bolt or clamp. In certain embodiments, the flanges 244, 254 may be held in contact with each other by the attachment of the heat pipes 240, 250 to a common structure, for example radiator panel 220A. In certain embodiments, a thermally conductive material, such as a facesheet or thermal grease, may be provided between the flanges 244, 254.

Figure 10:
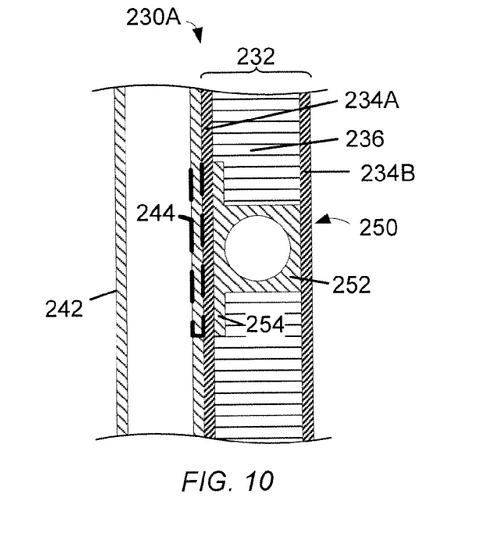
FIG. 10 is a cross-sectional view of a radiator panel according to certain aspects of the present disclosure.

FIG. 10 is a cross-sectional view of a radiator panel 230A according to certain aspects of the present disclosure. The section is taken along line A-A in FIG. 8 and passes through the center line of one of the heat pipes 242. The radiator panel 230A has, in this example, a core structure 232 with two facesheets 234A and 234B on opposite sides of a honeycomb panel 236 (the cells of the honeycomb layer 232 pass from left to right in this cross-sectional view). Facesheets 234A, 234B provide structural aspects of the core structure 232, for example the facesheets 234A, 234B act in tension and compression if the core structure 232 is subject to a bending moment. In certain embodiments, the facesheet 234A may comprise a metal, for example aluminum. In certain embodiments, the facesheet 234A may be a thin sheet, for example 0.012 inches thick. In certain embodiments, the facesheet 234B may be identical to facesheet 234A while, in other embodiments, facesheet 234B may be a different thickness of a common material or a different material.

In the embodiment of FIG. 10, the heat pipe 250 is disposed within the core structure 232 and between the facesheets 234A, 234B. When the heatpipe 242 is coupled to the panel 232, the flange 244, shown as a dashed outline in FIG. 10, is generally disposed over the flange 254 of heat pipe 250 with the facesheet 234A between the flanges 244, 254. In certain embodiments, the facesheet 234A is locally cut away from the flange 254 (not shown in FIG. 10). In certain embodiments, the longitudinal heat pipe 250 is shifted within the core structure 232 such that a surface of the flange 254 is exposed and flush with the exposed top surface of the facesheet 234A, such that flange 244 is in direct contact with flange 254.

Table 2 provides the results of a thermal analysis of a system 100 and a system 200 having extended radiator panels as disclosed herein. The system 100 has east and west radiators each having an area of 21 ft2 while the disclosed system 200 has east and west radiator areas each having an area of 38 ft2. Four equipment modules are mounted on the equipment panel 115, 215 of systems 100, 200 having sixteen flexible heat pipes 140, 240 arranged as previously described for the respective systems 100, 200. Each equipment module dissipates approximately 288 W, for a total of 1150 W. The acronyms are as introduced with Table 1, above, with the addition of:

| conditions of simulation | acronym |
| --- | --- |
| winter solstice, end-of-life performance | WSEOL |

The results consider the 15-yr end-of-life (EOL) conditions where maximum temperatures and temperature variations generally occur.

TABLE 2

Temperature performance of EWHTAs with and without extended panels

| Configuration | Analysis case | Min temp (deg C.) | Max temp (deg C.) | Max allowable temp (deg C.) | Average temp (deg C.) | Diurnal temp swing (deg C.) |
| --- | --- | --- | --- | --- | --- | --- |
| System 200 | VEEOL | 20 | 56 | 90 | 44 | 36 |
| | SSBOL | 6 | 23 | 90 | 16 | 17 |
| | AEBOL | 0 | 24 | 90 | 16 | 24 |
| | WSEOL | 27 | 54 | 90 | 42 | 27 |
| System 100 | VEEOL | 51 | 78 | 90 | 68 | 27 |
| | SSBOL | 38 | 52 | 90 | 47 | 14 |
| | AEBOL | 36 | 53 | 90 | 48 | 18 |
| | WSEOL | 51 | 77 | 90 | 66 | 25 |

The results show in Table 2 indicate that the peak predicted temperature of the equipment modules in system 200 drop more than 22° C., with a peak temperature of about 56° C., end-of-life at the vernal equinox, compared to the peak temperature of about 78° C. for the system 100. Additionally, given the reduced maximum temperatures of system 200, heater power may be used to limit the diurnal variations to even smaller ranges that shown in these results.

Table 3 provides the results of a thermal analysis of a system 200 as disclosed herein with flanges of various sizes. The overall geometric configuration and dimensions of the assembly are kept the same as for the system 200 analyzed for Table 2. Two flange dimensions are analyzed, with and without a 0.012 inch-thick aluminum facesheet disposed between the flanges, as well as a configuration without any flanges at all. The total heat load for the analysis of Table 3 was increased to a total of 2151 W to simulate future missions with higher heat loads.

TABLE 3

Temperature performance of EWHTA with extended panels at an elevated thermal load

| Configuration | Analysis case | Min temp (deg C.) | Max temp (deg C.) | Max allowable temp (deg C.) | Average temp (deg C.) | Diurnal temp swing (deg C.) |
| --- | --- | --- | --- | --- | --- | --- |
| 3" × 3" flange in direct contact | VEEOL | 56 | 86 | 90 | 77 | 30 |
| | SSBOL | 48 | 61 | 90 | 56 | 12 |
| | AEBOL | 41 | 62 | 90 | 56 | 20 |
| | WSEOL | 63 | 84 | 90 | 75 | 21 |
| 3" × 3" flange with 0.012" facesheet between the flanges | VEEOL | 55 | 86 | 90 | 77 | 31 |
| | SSBOL | 48 | 61 | 90 | 56 | 13 |
| | AEBOL | 41 | 61 | 90 | 56 | 20 |
| | WSEOL | 63 | 84 | 90 | 75 | 21 |
| 2" × 2" flange with 0.012" facesheet between the flanges | VEEOL | 57 | 87 | 90 | 79 | 32 |
| | SSBOL | 51 | 63 | 90 | 58 | 13 |
| | AEBOL | 43 | 64 | 90 | 59 | 22 |
| | WSEOL | 66 | 87 | 90 | 77 | 22 |
| No flanges | VEEOL | 64 | 97 | 90 | 88 | 33 |
| | SSBOL | 59 | 72 | 90 | 67 | 13 |
| | AEBOL | 49 | 73 | 90 | 67 | 23 |
| | WSEOL | 73 | 95 | 90 | 86 | 22 |

A comparison of the first and second data sets in Table 3 shows there is no significant impact by including an aluminum facesheet between the flanges. A comparison of the second and third data sets shows that the reduced coupling area (9 in2 vs. 4 in2) between the flexible heat pipes and longitudinal heat pipes causes only a slight increase in temperatures of the equipment modules in all cases. The results of the fourth case indicate that, in the absence of the thermal-coupling flanges, the temperature of the equipment modules at this higher thermal load will exceed the maximum allowed temperature of 90° C. at end-of-life and that the diurnal variation will exceed the allowable 30° C. by 3° C.

Figures 11, 12:
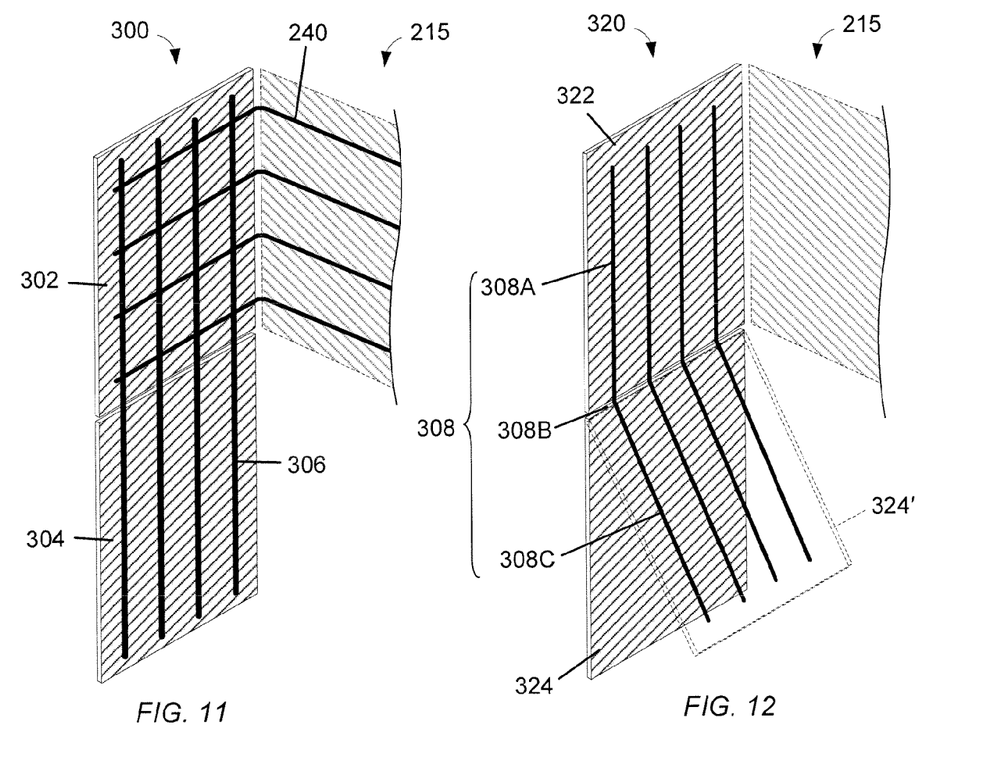
FIGS. 11 and 12 depict additional embodiments of another radiator panel according to certain aspects of the present disclosure.

FIGS. 11 and 12 depict additional embodiments 300, 320 of the radiator panel according to certain aspects of the present disclosure. In FIG. 11, the radiator panel 300 comprises two rigid sub-panels 302 and 304 that are bridged by rigid heat pipes 306. This allows the two sub-panels 302, 304 to be fabricated and/or mounted separately, for example to simplify the fabrication tooling as each radiator sub-panel 302, 304 is smaller than a single panel of the combined size. In certain embodiments, the upper portions of the heat pipes 306 are thermally coupled to the heat pipes 240. In certain embodiments, the heat pipes 306 may be disposed on the opposite side of the sub-panel 304 from the heat pipe 240. In certain embodiments, the heat pipes 306 may be disposed within sub-panel 304, for example between the facesheets of a honeycomb sandwich construction of sub-panel 304.

FIG. 12 depicts a radiator panel 320 wherein the sub-panel 324 is movable with respect to sub-panel 322. In certain embodiments, sub-panel 324 may rotate about an edge of panel 322 to a position 324', shown with dashed lines in FIG. 12. In certain embodiments, for example a satellite being launched within a fairing (not shown in FIG. 10), position 324' may be a launch position selected to fit the sub-panel 324 within the fairing and the sub-panel 324 moves to the position that is parallel to and aligned with sub-panel 322 after reaching orbit. Flexible heat pipes 308 bridges the sub-panels 322, 324. Each flexible heat pipe 308 has, in this example, a rigid portion 308A coupled to at least the sub-panel 322, a flexible portion 308B, and a rigid portion 308C that is thermally coupled to sub-panel 324. In general, flexible heat pipes 308 may share some of the attributes of flexible heat pipes 240.

The disclosed examples of an east-west heat transfer assembly having extended radiator panels illustrate how the increased area of the radiator panels and the inclusion of longitudinal heat pipes in the radiator panels reduces the peak temperatures and temperature variations seen by equipment modules that are thermally coupled to the flexible heat pipes on the internal equipment panel. The thermal cross-coupling the flexible heat pipes by the longitudinal heat pipes also reduces the temperature differences between the flexible heat pipes, thereby reducing the sensitivity to the placement of equipment modules on the flexible heat pipes and providing a more uniform temperature on the equipment panel. With one of the east and west radiator panels always facing toward deep space, the heat received by the Sun-facing radiator panel is transferred to the other radiator panel and rejected to deep space rather than being transferred into the equipment modules. This provides the additional benefit of reducing or eliminating the need for heater power to maintain the equipment modules within a certain temperature range. While the disclosed configurations include pairs of radiator panels on each of the east and west sides of the spacecraft, it will be apparent to those of skill in the art that the number, size, and location of the radiator panels can be varied without departing from the scope of this disclosure. In addition, the same principles and designs can be applied to the north-facing and south-facing radiator panels of a GEO spacecraft or to a non-orbiting spacecraft to provide easy access to the interior of the spacecraft without prior removal or disassembly of the thermal control system.

This application includes description that is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented. Thus, the claims are not intended to be limited to the aspects shown herein, but are to be accorded the full scope consistent with the language claims.

Headings and subheadings, if any, are used for convenience only and do not limit the invention.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the terms "a set" and "some" refer to one or more.

To the extent that the terms "include," "have," or the like are used in the description or the claims, such terms are intended to be inclusive in a manner similar to the term "comprise" as "comprise" is interpreted when employed as a transitional word in a claim.

Terms such as "top," "bottom," "upper," "lower," "left," "right," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Pronouns in the masculine (e.g., his) include the feminine and neuter gender (e.g., her and its) and vice versa.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other configurations, such as curved or tapered for example, in some embodiments.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such as an embodiment may refer to one or more embodiments and vice versa. The word "exemplary" is used herein to mean "serving as an example or illustration." Any aspect or design described herein as "exemplary" is not necessarily to be construed as preferred or advantageous over other aspects or designs.

Nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. A heat transfer assembly, comprising:
    an equipment panel having a first length in a longitudinal direction;
    a first radiator panel coupled to one of an east end and a west end of the equipment panel, the first radiator panel comprising a second length in the longitudinal direction and at least a first longitudinal heat pipe, the second length being greater than the first length;
    a second radiator panel coupled to the other of the east and west ends of the equipment panel, the second radiator panel comprising at least a second longitudinal heat pipe; and
    at least one continuous flexible heat pipe comprising a first rigid tube coupled to the equipment panel, a second rigid tube thermally coupled to the first longitudinal heat pipe, and a third rigid tube thermally coupled to the second longitudinal heat pipe;
    wherein the equipment panel is configured to retain an equipment module in thermal contact with the first rigid tube.

2. The heat transfer assembly of claim 1, wherein the at least one continuous flexible heat pipe further comprises a first flexible tube sealingly coupled between the first and second rigid tubes.

3. The heat transfer assembly of claim 2, wherein the second radiator panel comprises a third length in the longitudinal direction, the third length being greater than the first length, and wherein the at least one continuous flexible heat pipe further comprises a second flexible tube sealingly coupled between the first and third rigid tubes.

4. The heat transfer assembly of claim 3, wherein the first rigid tube is capable of evaporating a heat transfer fluid from a liquid to a vapor by accepting heat from one or more equipment modules that are thermally coupled to the second rigid tube.

5. The heat transfer assembly of claim 4, wherein the second and third rigid tubes are each capable of evaporating the heat transfer fluid from a liquid to a vapor by accepting heat from the associated one of the first and second radiator panels.

6. The heat transfer assembly of claim 5, wherein the at least one continuous flexible heat pipe is capable of transferring heat from the hotter of the first and second radiator panels to the colder of the first and second radiator panels.

7. The heat transfer assembly of claim 1, wherein the at least one continuous flexible heat pipe comprises a plurality of flexible heat pipes with the respective first tubes arranged generally in an east-west direction on the equipment panel.

8. The heat transfer assembly of claim 1, wherein:
    the first radiator panel comprises a first sub-panel and a second sub-panel;
    the first sub-panel is coupled to the equipment panel; and
    the first longitudinal heat pipe bridges the first and second sub-panels and is thermally coupled to the second sub-panel.

9. The heat transfer assembly of claim 8, wherein the first sub-panel is movable coupled to the equipment panel.

10. The heat transfer assembly of claim 8, wherein:
    the second sub-panel is movable coupled to the first sub-panel; and
    the first longitudinal heat pipe comprises a first rigid portion that is coupled to the first sub-panel, a second rigid portion that is coupled to the second sub-panel, and flexible portion that is sealingly coupled between the first and second rigid portions of the first longitudinal heat pipe.

11. The radiator panel of claim 1, wherein the first rigid tube, the second rigid tube, and the third rigid tube form a sealed interior volume.

12. The radiator panel of claim 1, wherein the at least one continuous flexible heat pipe runs from the first radiator panel, across the equipment panel, to the second radiator panel.

* * * * *